M. SEGRE.
MANUFACTURE OF ARTICLES OF HORNY MATERIAL.
APPLICATION FILED AUG. 13, 1915.

1,258,475.

Patented Mar. 5, 1918.

Mario Segre
Inventor,
by Lawrence Langner
Attorney

UNITED STATES PATENT OFFICE.

MARIO SEGRE, OF VERCELLI, ITALY.

MANUFACTURE OF ARTICLES OF HORNY MATERIAL.

1,258,475.  Specification of Letters Patent.  Patented Mar. 5, 1918.

Application filed August 13, 1915. Serial No. 45,356.

*To all whom it may concern:*

Be it known that MARIO SEGRE, a subject of the King of Italy, and resident of Vercelli, Italy, have invented certain new and useful Improvements in the Manufacture of Articles of Horny Material, of which the following is a specification.

This invention relates to the manufacture of articles of horny material.

The use of horny material is at present limited owing to the small thickness of the plate that can be obtained, for instance, from the nails of animals and owing to the high price thereof when the material is of substantial thickness. The object of this invention is to overcome the drawbacks hitherto encountered, by uniting together blanks of small thickness in order to form blanks of sufficient thickness for the manufacture of any desired article.

According to the present invention the blanks cut off from a plate, obtained in the usual way, for instance, from a nail, are first of all subjected to stamping by heat in such a way as to be formed on one or both sides with a groove or ridge, preferably dovetailed, and are then assembled together before subjecting the blank thus obtained to a further compression under heat in a matrix having the form of the article to be manufactured. By this method horny material may be used for the manufacture of any article, such articles being of great strength, because of the assembling effected by the compression between the various elements, and being obtained at a small cost, the operations required for their manufacture being limited to the stamping operation.

Figure 1:
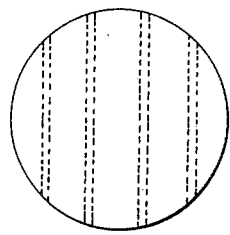
Figure 2:
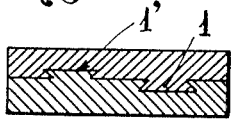
Figure 3:
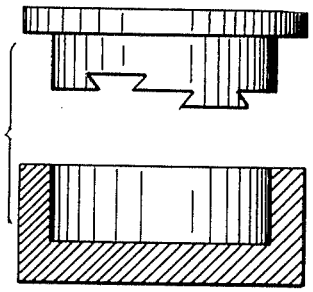
Figure 4:
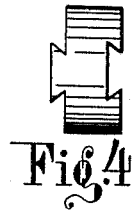
Figure 5:
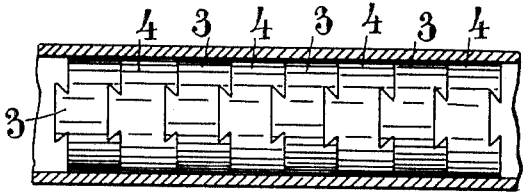
Figure 6:
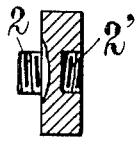
Figure 7:
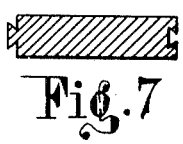
Figure 8:
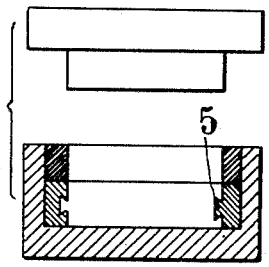
Figure 9:
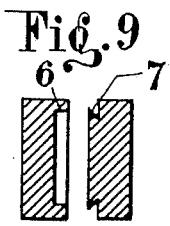
Figure 10:

The invention is illustrated by way of example in the accompanying drawings, in which:—Figure 1 is a sectional elevation of two disks connected together by means of dovetailed ridges, Fig. 2 being a plan view thereof and Fig. 3 an elevation and a sectional elevation of the two parts of a matrix used for forming one of these disks. Fig. 4 is a disk formed with a profile on its two sides, Fig. 5 showing a method of shaping simultaneously a larger number of these disks; Fig. 6 is a section of a disk provided with a screw threaded rod on one side and with a screw threaded hole on the other side; Fig. 7 illustrates a blank in which the assembling means are provided on the short wall of the blank; Fig. 8 illustrates an elevation and a sectional elevation of the two parts of the corresponding matrix respectively; Fig. 9 shows two disks which are assembled together along their periphery; Fig. 10 illustrates a section across another form of blank and Fig. 11 the central core used for assembling together two blanks as shown in Fig. 10, while Fig. 12 is a section of a roller thus assembled together.

The blank obtained from the plate of horny or like material is subjected to pressure under heat in a matrix in order to be formed on one or both sides, with the connecting members, such as with dovetailed ridges 1 and corresponding grooves 1' (Figs. 1 and 4) or with screw threaded rods 2 and screw threaded holes 2' (Fig. 6) or broadly with projections and recesses intended to engage with each other when the different blanks are united together.

The assembling means on the blanks are formed thereon by compression under heat in suitable matrices.

The matrix shown in Fig. 3 is used for forming on one of the sides of a disk a ridge and a groove which are parallel to each other and by which the disk can be connected to a correspondingly shaped disk (Figs. 1 and 2). In the same way articles of a certain length may be obtained by means of a plurality of blanks as shown in Fig. 4, which being provided with a ridge on one side and with a groove on the opposite side may be assembled together to produce the desired length.

Similar blanks may be obtained in large quantity by arranging alternately blanks of horny material 3 and metallic matrices 4 of the shape shown in Fig. 5 in a cylindrical or prismatic sleeve. In this way after withdrawing the column of blanks 3 and matrices 4 from the cylinder, the blanks 3 are removed from the matrices 4 by a lateral sliding movement and thus a large quantity of blanks is obtained, which may subsequently be assembled by stamping under heat.

Disks of the form shown in Fig. 6 and intended to be screwed on to one another may also be obtained according to the method just referred to.

When it is required to assemble the various blanks in a lateral direction, the ridge and groove referred to are provided on the lateral surface of the blanks (Fig. 7) and the latter are compressed in a matrix provided with removable members 5 which are withdrawn from the blank after the removal of the latter from the matrix.

The same method may be employed for connecting together the two ends of a band which are brought close to each other, or the edges of a plate which is rolled up, in order to form an annular blank or a cylindrical sleeve.

When it is desired to insure a perfect union on the periphery, the method illustrated in Fig. 9 may be employed, according to which an annular flange 6 is provided on one of the blanks, and an annular recess 7 on the blank intended to be used in conjunction therewith, said annular recess being dove-tailed and produced by means of a split collar.

The blank obtained by assembling together the various primary blanks prepared in the manner hereinbefore described is subjected to compression under heat in a matrix having the shape of the article to be manufactured, whereby the ridges are destroyed in the grooves, the screws are deformed, the projecting flange engages in the peripheral recess and the different members are thus assembled together in such a manner that they cannot be separated again.

The outer surfaces of the blanks are sometimes provided with grooves or are checkered during the stamping operation, this being effected when it is desired to conceal the lines of separation between the primary blanks composing the complete blank.

The assembling together of two or more primary blanks may simply be effected for the purpose of obtaining a plate or disk of greater thickness, whereby the further advantage is gained that the bending tendency of the individual primary blanks is overcome, or it may be effected in order to obtain the necessary thickness for the manufacture of a certain article, in which case, the compression or drawing to which the material is subsequently subjected insures the adherence of the various primary blanks as if they were one single blank. This method thus renders it possible to obtain any article by stamping, even when its thickness is greater than that of the original plates.

Figure 11:
Figure 12:
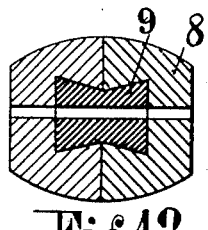

The assembling method hereinbefore described may be used directly for the manufacture of articles such as shown in Figs. 10—12, two caps 8 of horny material and a metal core 9 being united together to form a roller by a successive stamping which permits of fixing the caps upon the internal core.

In the same way a metal reinforcement, such as a tube or rod, may be introduced into the various blanks to be connected together and be incorporated therewith by subsequently compressing the horny materal around the metal reinforcement under heat in a matrix of suitable shape.

It will be obvious that in practice the one or the other mode of manufacture hereinbefore described will be used according to the form and purpose of the article to be manufactured, the method described permitting, without involving great cost, of uniting together primary blanks of horny material in order to produce blanks of any desired thickness which can consequently be used for the stamping of any article.

What I claim as my invention and desire to secure by U. S. Letters Patent is:—

A method of producing articles of animal horn or hoof having a greater thickness than the natural thickness of the material, consisting in cutting blanks of this material, arranging alternately said blanks and matrices in a die, said matrices having the counterpart of projections or recesses, compressing said blanks and matrices under heat, then removing the blanks from the die and matrices, assembling a plurality of said blanks by engaging their corresponding projections and recesses with each other to form a single blank of the desired thickness, and compressing said blank in a matrix having the final shape of the article.

Signed at Turin, Italy, this 24th day of July, A. D. 1915.

MARIO SEGRE.

Witnesses:
MARIO TORTA,
C. S. FEYLES.